(12) United States Patent
Kawashima

(10) Patent No.: US 10,958,058 B2
(45) Date of Patent: Mar. 23, 2021

(54) WIRE UNIT

(71) Applicant: Sumitomo Wiring Systems, Ltd., Yokkaichi (JP)

(72) Inventor: Yuji Kawashima, Yokkaichi (JP)

(73) Assignee: Sumitomo Wiring Systems, Ltd.

( * ) Notice: Subject to any disclaimer, the term of this patent is extended or adjusted under 35 U.S.C. 154(b) by 0 days.

(21) Appl. No.: 16/614,415

(22) PCT Filed: May 7, 2018

(86) PCT No.: PCT/JP2018/017575
§ 371 (c)(1),
(2) Date: Nov. 18, 2019

(87) PCT Pub. No.: WO2018/216449
PCT Pub. Date: Nov. 29, 2018

(65) Prior Publication Data
US 2020/0153218 A1    May 14, 2020

(30) Foreign Application Priority Data
May 24, 2017  (JP) .............................. JP2017-102336

(51) Int. Cl.
*H02G 3/34*  (2006.01)
*F16B 9/00*  (2006.01)

(52) U.S. Cl.
CPC  *H02G 3/34* (2013.01); *F16B 9/05* (2018.08)

(58) Field of Classification Search
USPC ...................................................... 248/67.5
See application file for complete search history.

(56) References Cited

U.S. PATENT DOCUMENTS 1,692,167 A * 11/1928 Gates .................. E04G 17/0754
                                                  249/215
2,184,783 A * 12/1939 Tinnerman ............ F16B 37/043
                                                  411/34

(Continued)

FOREIGN PATENT DOCUMENTS

JP    52-057260    4/1977
JP    53-26456     3/1978

(Continued)

OTHER PUBLICATIONS

International Search Report dated Jun. 26, 2018.
Chinese Office Action dated Jun. 2, 2020.

*Primary Examiner* — William H. Mayo, III
*Assistant Examiner* — Krystal Robinson
(74) *Attorney, Agent, or Firm* — Gerald E. Hespos; Michael J. Porco; Matthew T. Hespos

(57) ABSTRACT

Provided is a wiring unit that reduces spatial constraints and makes it possible to easily perform wiring work. The wiring unit is provided with: a plate on which a support surface for supporting electrical wires is formed; and a holding member for holding the electrical wires between the support surface and said holding member. The holding member comprises a plurality of holding pieces protruding from the support surface side. After being collapsed from an upright orientation in which the holding pieces stand upright so as to demarcate a guidance space in which the electrical wires are guided toward the support surface side, each of said holding pieces presses the electrical wires toward the support surface side and deforms toward a holding orientation in which the electrical wires are restricted from lifting up from the support surface.

5 Claims, 8 Drawing Sheets

(56) References Cited

U.S. PATENT DOCUMENTS

| | | | | |
|---|---|---|---|---|
| 2,407,249 A * | 9/1946 | Burner | E04C 5/18 | 52/686 |
| 2,761,457 A * | 9/1956 | Wood | A45D 8/12 | 132/276 |
| 3,137,021 A * | 6/1964 | English | A46B 13/006 | 15/182 |
| 3,854,684 A * | 12/1974 | Moore | F16L 3/227 | 248/68.1 |
| 4,145,840 A * | 3/1979 | Davidson | A01G 9/128 | 47/44 |
| 4,490,886 A * | 1/1985 | Omata | F16L 3/233 | 24/16 PB |
| 4,679,754 A * | 7/1987 | Richards | F16L 3/23 | 24/458 |
| 4,766,651 A * | 8/1988 | Kobayashi | B60R 16/0215 | 24/16 PB |
| 4,815,172 A * | 3/1989 | Ward | A44B 18/00 | 24/16 R |
| 4,993,669 A * | 2/1991 | Dyer | B65D 63/16 | 24/16 PB |
| 5,131,613 A * | 7/1992 | Kamiya | F16L 3/233 | 24/16 PB |
| 5,149,026 A * | 9/1992 | Allen | F16L 3/227 | 248/68.1 |
| 5,236,725 A * | 8/1993 | McCormack | G09F 23/00 | 40/666 |
| 5,598,995 A * | 2/1997 | Meuth | E21B 17/1035 | 248/74.3 |
| 5,992,802 A * | 11/1999 | Campbell | H02G 3/30 | 248/68.1 |
| 6,250,847 B1 * | 6/2001 | Bingham, Jr. | F16L 3/1211 | 138/106 |
| 6,319,044 B1 * | 11/2001 | Stekelenburg | H01R 13/6392 | 439/369 |
| 6,402,096 B1 * | 6/2002 | Ismert | F16L 3/243 | 248/68.1 |
| 6,446,915 B1 * | 9/2002 | Ismert | F16L 3/243 | 248/68.1 |
| 6,463,631 B2 * | 10/2002 | Noda | F16L 3/1025 | 24/16 R |
| 6,464,181 B2 * | 10/2002 | Sakakura | F16L 3/23 | 24/16 PB |
| D587,988 S * | 3/2009 | Johansson | D8/356 | |
| 8,020,811 B2 * | 9/2011 | Nelson | F16L 3/2235 | 248/68.1 |
| 8,112,964 B2 * | 2/2012 | Baruh | E04C 5/167 | 52/719 |
| 8,141,826 B1 * | 3/2012 | Gallardo | F16L 3/243 | 248/74.4 |
| 8,480,041 B2 * | 7/2013 | Myers | F16L 3/1211 | 248/72 |
| 9,033,287 B2 * | 5/2015 | Zyrull | H02G 3/24 | 248/49 |
| 9,077,167 B2 * | 7/2015 | Blanchard | H02G 3/263 | |
| 9,484,723 B2 * | 11/2016 | Doshita | H02G 3/32 | |
| 9,488,208 B2 * | 11/2016 | Hemingway | F16B 7/0433 | |
| 9,533,808 B2 * | 1/2017 | Berglund | B65D 63/00 | |
| 9,548,598 B2 * | 1/2017 | Tally | H02G 3/32 | |
| 9,810,021 B2 * | 11/2017 | Sylvester | H02G 3/32 | |
| D824,244 S * | 7/2018 | Rothbaum | D8/356 | |
| 10,266,122 B2 * | 4/2019 | Rouleau | H02G 3/32 | |
| 10,295,084 B2 * | 5/2019 | Izawa | F16L 3/1075 | |
| 10,352,273 B2 * | 7/2019 | Soria | F16B 17/00 | |
| 10,407,985 B2 * | 9/2019 | Sylvester | H02G 3/0456 | |
| 2003/0015628 A1 * | 1/2003 | Rivera | F16L 3/08 | 248/74.3 |
| 2003/0033693 A1 * | 2/2003 | Despault | D03D 15/0083 | 24/16 PB |
| 2004/0172790 A1 * | 9/2004 | Caveney | F16L 3/233 | 24/20 R |
| 2006/0144615 A1 * | 7/2006 | Girot | F16L 3/1025 | 174/135 |
| 2006/0254031 A1 * | 11/2006 | DeMik | B65D 63/1036 | 24/16 PB |
| 2006/0284027 A1 * | 12/2006 | Smith | F16L 55/035 | 248/65 |
| 2007/0011850 A1 * | 1/2007 | Downing | A44B 11/12 | 24/16 R |
| 2007/0138350 A1 * | 6/2007 | Brown | F16L 3/2431 | 248/65 |
| 2007/0290100 A1 * | 12/2007 | Caveney | H02G 3/0437 | 248/74.3 |
| 2009/0026327 A1 * | 1/2009 | Zeuner | F16L 3/123 | 248/72 |
| 2009/0235494 A1 * | 9/2009 | Browne | F16L 3/2332 | 24/16 R |
| 2010/0088939 A1 * | 4/2010 | Maniwa | B65C 7/00 | 40/663 |
| 2011/0073718 A1 * | 3/2011 | Whipple | F16L 3/2431 | 248/58 |
| 2011/0084179 A1 * | 4/2011 | Wiedner | F16L 3/12 | 248/67.7 |
| 2011/0315829 A1 * | 12/2011 | Darnell | H02G 3/0456 | 248/67.5 |
| 2012/0012715 A1 * | 1/2012 | Andersen | H02G 3/32 | 248/74.1 |
| 2012/0193120 A1 * | 8/2012 | Edmond | H02G 3/0437 | 174/68.3 |
| 2013/0075153 A1 * | 3/2013 | Viviant | H02G 3/0418 | 174/503 |
| 2013/0092803 A1 * | 4/2013 | Fujiwara | F16B 2/22 | 248/74.2 |
| 2013/0223807 A1 * | 8/2013 | Elford | G02B 6/504 | 385/134 |
| 2014/0017025 A1 * | 1/2014 | Hemingway | H02G 3/32 | 411/15 |
| 2014/0224945 A1 * | 8/2014 | Okuhara | H02G 3/30 | 248/74.1 |
| 2015/0097089 A1 * | 4/2015 | Taylor | B60H 1/00521 | 248/52 |
| 2016/0025243 A1 * | 1/2016 | Vilhelmsen | H02G 3/305 | 248/68.1 |
| 2016/0031390 A1 | 2/2016 | Kawashima et al. | | |
| 2019/0044258 A1 * | 2/2019 | Everest | H01Q 1/16 | |

FOREIGN PATENT DOCUMENTS

| | | |
|---|---|---|
| JP | 62-291097 | 12/1987 |
| JP | 10-229283 | 8/1998 |
| JP | 2014-199069 | 10/2014 |
| JP | 2016-136799 | 7/2016 |

\* cited by examiner

WIRE UNIT

BACKGROUND

Field of the Disclosure

This disclosure relates to a wire unit.

Related Art

Japanese Laid-Open Patent Publication No. 2014-199069 describes a wire unit installed in an automatic transmission of an automobile. The wire unit includes multiple electrical wires and a retaining plate that includes a support surface supporting the electrical wires. The retaining plate is formed integrally with a pressing portion. The pressing portion includes a side piece projecting from the support surface and a pressing piece that is orthogonally bent from the rising edge of the side piece. The pressing portion is maintained in an L-shaped configuration as a whole. The electrical wires are inserted through a protection tube and inserted from a sideward direction in a press-fitting manner into a gap between the pressing piece and the support surface so that the electrical wires are retained. The electrical wires are fastened to the support plate with cable ties at opposite sides of the pressing portion in the longitudinal direction.

In this type of wire unit, before performing the fastening task with cable ties, a task (routing task) of setting each electrical wire to a certain shape needs to be performed in accordance with the routing path. These tasks are complicated and burdensome. In this regard, in the above configuration, the pressing portion restricts lifting of the electrical wires. However, the work space for inserting the electrical wires from a sideward direction into the gap between the pressing piece and the support surface is necessary. The above configuration cannot be applied in an environment in which such work space cannot be ensured.

The present disclosure is presented in response to issues such as those described above. It is an object of the disclosure to provide a wire unit that reduces space constraints and facilitates a wiring task.

SUMMARY

A wire unit of this disclosure is characterized by a plate including a support surface that supports multiple electrical wires, a retaining member that retains the electrical wires between the support surface and the retaining member, and a protection tube that covers the electrical wires collected in a bundle. The retaining member is formed of a metal wire member and includes multiple retaining pieces projecting from a side of the support surface. Each of the retaining pieces is configured to be collapsed from a standing position in which the retaining pieces stand to define a guide space between the retaining pieces, in which the guide space is configured to guide the electrical wires toward the support surface, and configured to be deformed to a retaining position that presses the electrical wires toward the support surface, and the protection tube is held between the retaining member and the electrical wires.

When the retaining pieces are in the standing position, the electrical wires are guided into the guide space between the retaining pieces and reach the support surface. Thus, when the task of inserting the electrical wires between the retaining pieces is performed, the electrical wires are readily arranged on predetermined positions of the support surface. In particular, a preparatory routing task may be omitted.

The guide space between the retaining pieces includes an open side that is opposed to the support surface and is open as the wire inlet. Thus, the work space for inserting the electrical wires is ensured to be without interference. The retaining pieces are collapsed from the standing position to be deformed to the retaining position, which restricts lifting of the electrical wires from the support surface. Thus, the electrical wires are retained stably on the support surface. In addition, the retaining pieces are configured not to project overly far from the support surface so that the space constraints are further reduced.

The retaining pieces may be bendable and deformable in directions toward each other and away from each other. In the standing position, each retaining piece may include a tapered wide portion that widens toward a wire inlet of the guide space, and a narrow portion located at a side of the wide portion opposite to the wire inlet. The narrow portion may include a temporary retainer that restricts lifting of the electrical wires from the support surface. This allows the electrical wires to smoothly reach the support surface along the wide portions. In addition, since the temporary retainer restricts lifting of the electrical wires from the support surface, when the retaining pieces are in the standing position, unintentional removal of the electrical wires from the guide space is prevented.

The retaining member may be formed of a wire member, and the retaining pieces are twisted and tied together in the retaining position. This allows adjustment of the tying diameter of each retaining piece. Thus, the diameter and shape of the electrical wire need not be entirely constant. In addition, since the retaining member is formed of a wire member, the twisting process is facilitated and the weight may be reduced.

Portions of the retaining pieces that are twisted and tied together may disposed in a state collapsed toward the electrical wire. In this configuration, the portions of the retaining pieces twisted and tied together do not project overly far in a direction extending away from the support surface. This further reduces the space constraints.

The retaining member may include a connecting piece that connects the retaining pieces to each other. The connecting piece may be disposed along a surface of the plate opposite to the support surface, and the retaining pieces may be positioned by being inserted into respective slots formed in the plate. In this configuration, the retaining member is coupled reliably and stably to the predetermined position of the plate.

DETAILED DESCRIPTION

First Embodiment

Figure 1:
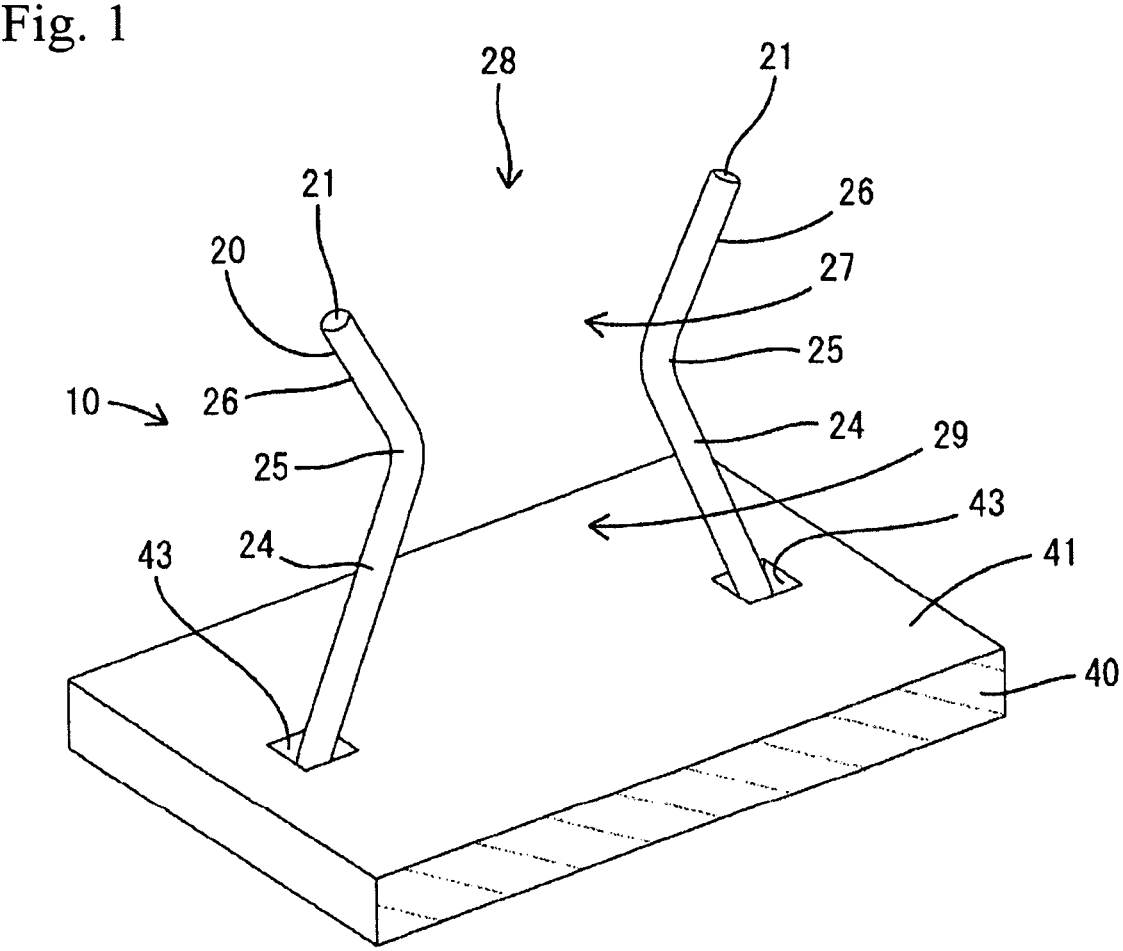
FIG. 1 is a perspective view of a first embodiment of the present invention showing a state in which a retaining member is coupled to a plate and each retaining piece is in a standing position.

A first embodiment of a wire unit 10 according to the disclosure is installed in an automatic transmission of an automobile and is used in a portion of control related to transmission operation. The wire unit 10 includes multiple electrical wires 60 configured to connect various electric components such as a ROM and a connector (not shown) to each other, a plate 40 including a support surface 41 that supports the electrical wires 60, and multiple retaining members 20 (only one shown) that retain the electrical wires 60 between the support surface 41 of the plate 40 and the retaining members 20 on a predetermined position in the routing path of the electrical wires 60.

Figure 10:
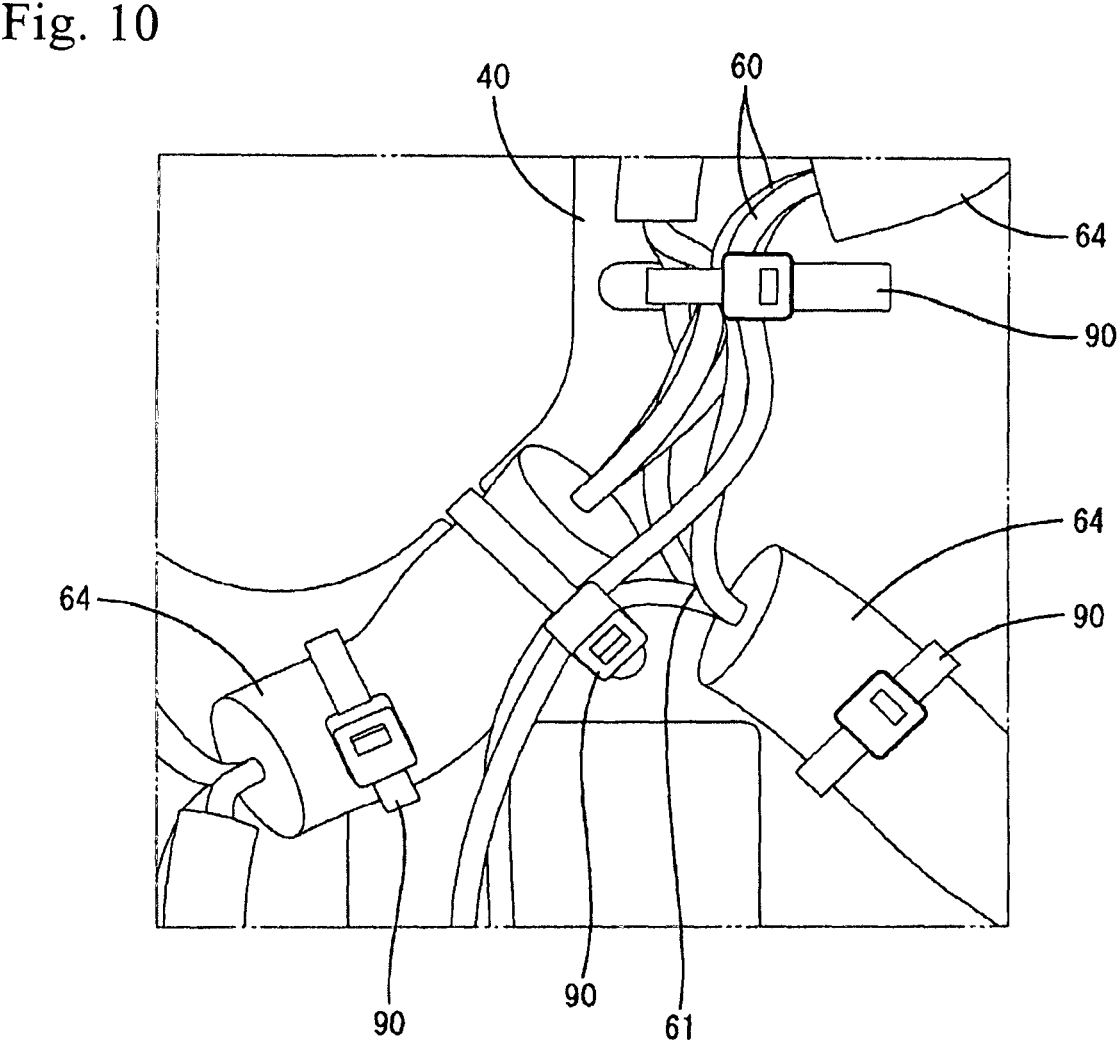
FIG. 10 is a plan view showing a reference example of a wire unit.

Each electrical wire 60 is a coated electrical wire having a circular cross section. Although not shown in the drawings, the electrical wire 60 is configured so that multiple core wires are enclosed with an insulation resin. The electrical wires 60 are collected in a bundle and covered with a protection tube 64 in a predetermined range in the longitudinal direction. The protection tube 64 is a flexible tubular rubber material and is held between the retaining member 20 and the electrical wires 60 to protect the electrical wires 60. Protection tubes 64 are arranged on different positions in the routing path of each electrical wire 60 (refer to FIG. 10 showing reference example). In the description below, the part configured by the electrical wires 60 and the protection tube 64 covering the electrical wires 60 is referred to as a wire bundle part 65.

The plate 40 is formed, for example, by three-dimensionally bending a metal plate and is fastened to the body of the automatic transmission with bolts (not shown). As in the reference example shown in FIG. 10, the electrical wires 60 include multiple division portions 61 in intermediate portions of the routing path. The division portions 61 are used to configure a division circuit. In the reference example shown in FIG. 10, cable ties 90 (tying bands) are arranged to tie and fix the electrical wires 60 at positions corresponding to the division portions 61. The division circuit is configured through the cable ties 90. In the first embodiment, the retaining members 20 may be used instead of the cable ties 90. The retaining members 20 may be arranged in positions of the routing path corresponding to the division portions 61.

Figure 6:
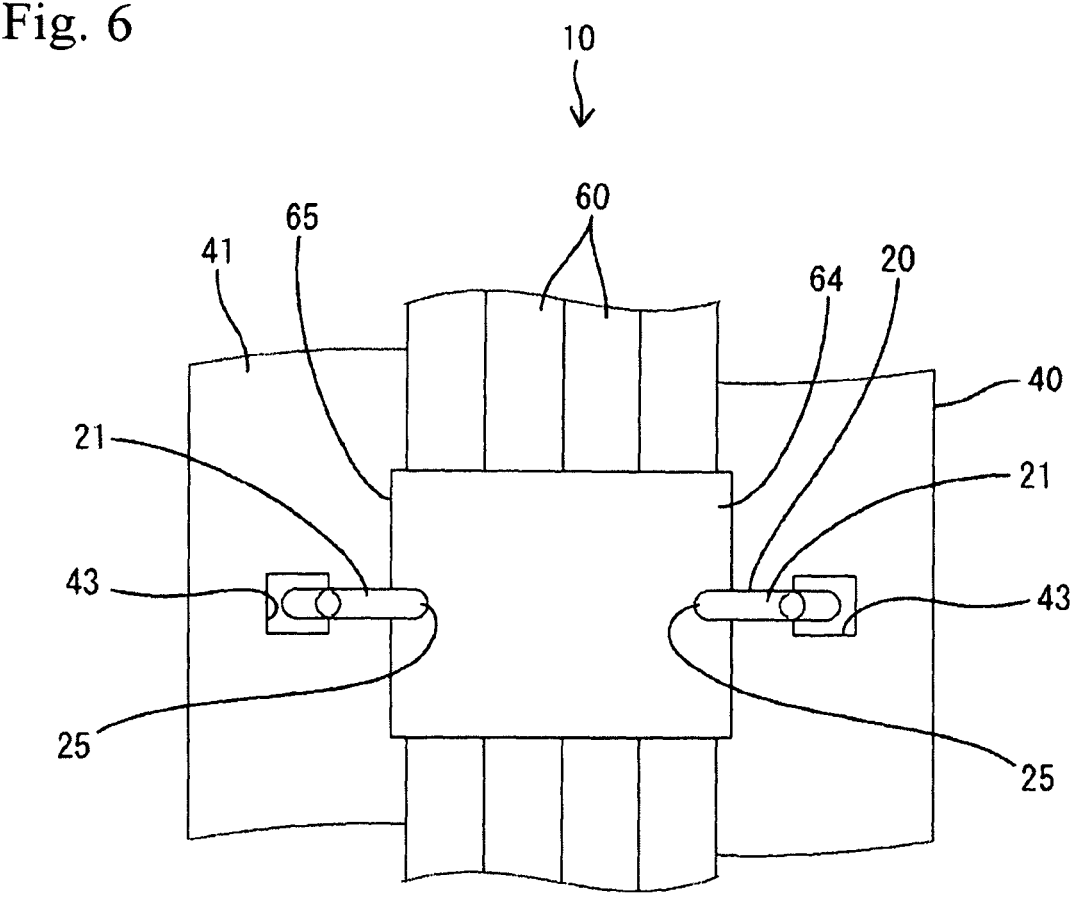
FIG. 6 is a plan view showing a state in which each retaining piece is in a standing position and the electrical wires are supported by the support surface of the plate.

As shown in FIGS. 1 and 6, the periphery of the plate 40 includes a flat support surface 41, and the wire bundle part 65 is mounted on the support surface 41. In a position where the retaining member 20 is arranged on the support surface 41, the plate 40 includes two slots 43 separated from each other by a predetermined distance. Each slot 43 has a rectangular cross section and extends through the plate 40 in the thickness-wise direction.

Figure 9:
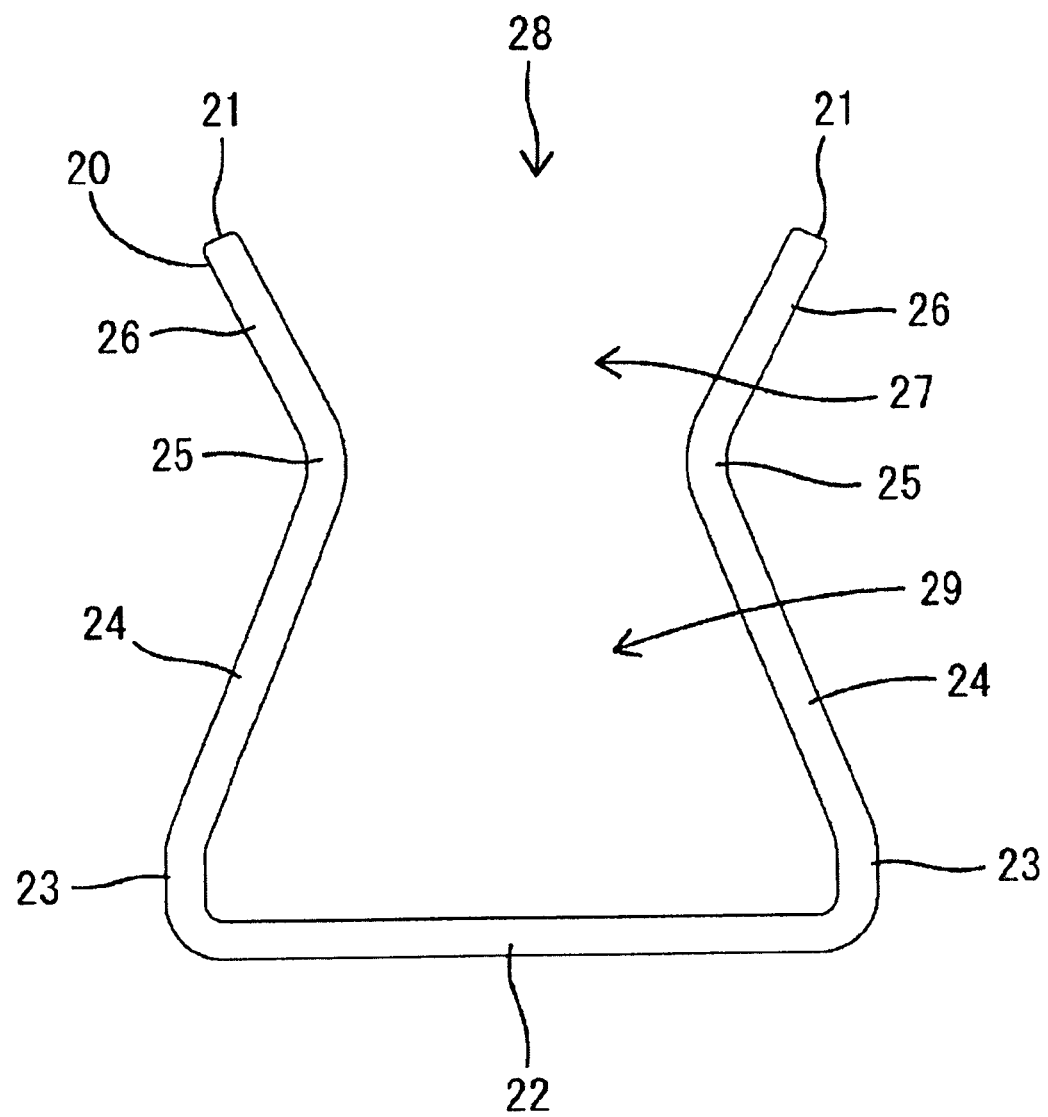
FIG. 9 is a front view of the retaining member.

Each retaining member 20 is a metal wire member having a circular cross section. As shown in FIG. 9, the retaining member 20 is symmetrical at the left and right sides and includes two retaining pieces 21 opposing each other in the sideward direction and the connecting piece 22 connecting the ends of the retaining pieces 21. When the retaining member 20 is retained on the plate 40, the retaining pieces 21 are in the standing position, ready to receive the electrical wires 60. Then, when collapsed from the standing position, the retaining pieces 21 are in the retaining position, pressing the electrical wires 60 to the support surface 41. When the retaining members 20 are shaped, they are shaped in the standing position.

The connecting piece 22 extends straight in the sideward direction (width-wise direction). Each retaining piece 21 includes a straight portion 23 extending upward from the corresponding one of the sideward ends of the connecting piece 22, an inverted-tapered narrow portion 24 so that the narrow portions 24 upwardly extend toward each other from the upper end of the straight portion 23, and a tapered wide portion 26 so that the wide portions 26 upwardly extend away from each other from a narrow portion end 25 of the narrow portion 24 located at an upper side. The interval between the straight portions 23 of the retaining pieces 21 corresponds to the interval between the slots 43 in the plate 40. The rising dimension (vertical dimension) of the straight portion 23 of each retaining piece 21 corresponds to the thickness of the plate 40.

An inner space defined between the wide portions 26 of the retaining pieces 21 configures the guide space 27 that guides the wire bundle part 65 to the support surface 41. The guide space 27 includes an upper end opening extending between wide portion ends of the wide portions 26 of the retaining pieces 21 and defining the wire inlet 28. In addition, an inner space defined between the narrow portions 24 of the retaining pieces 21 configures a temporary retaining space 29 that accommodates the wire bundle part 65 so that the wire bundle part 65 is temporarily retained on the support surface 41. The width-wise dimension of the wire bundle part 65 is set to be greater than the width-wise dimension between the narrow portion ends 25 and less than the width-wise dimension (of wire inlet 28) between the wide portion ends of the wide portions 26.

The operation and advantages of the wire unit 10 of the first embodiment will now be described.

During coupling, the retaining member 20 is disposed at the rear surface side of the plate 40 (side opposite to the support surface 41). In this state, the retaining pieces 21 of the retaining member 20 are inserted into the respective slots 43 in the plate 40. After the retaining pieces 21 are bent and deformed, the straight portions 23 are inserted into the slots 43, and the narrow portions 24 come into contact with the open edges of the support surface 41 defining the slots 43. This restricts removal of the retaining member 20 toward the rear surface side of the plate 40. In addition, the connecting piece 22 is arranged to be contactable with the rear surface of the plate 40. This restricts removal of the retaining member 20 toward the front surface side of the plate 40. As described above, the retaining member 20 is retained on the plate 40 in the standing position (refer to FIG. 1). In this state, the retaining pieces 21 project from the support surface 41 of the plate 40 so that the wide portions 26 are tapered and upwardly widen. Multiple retaining members 20 are coupled to the plate 40 at predetermined positions in the routing path.

Figure 2:
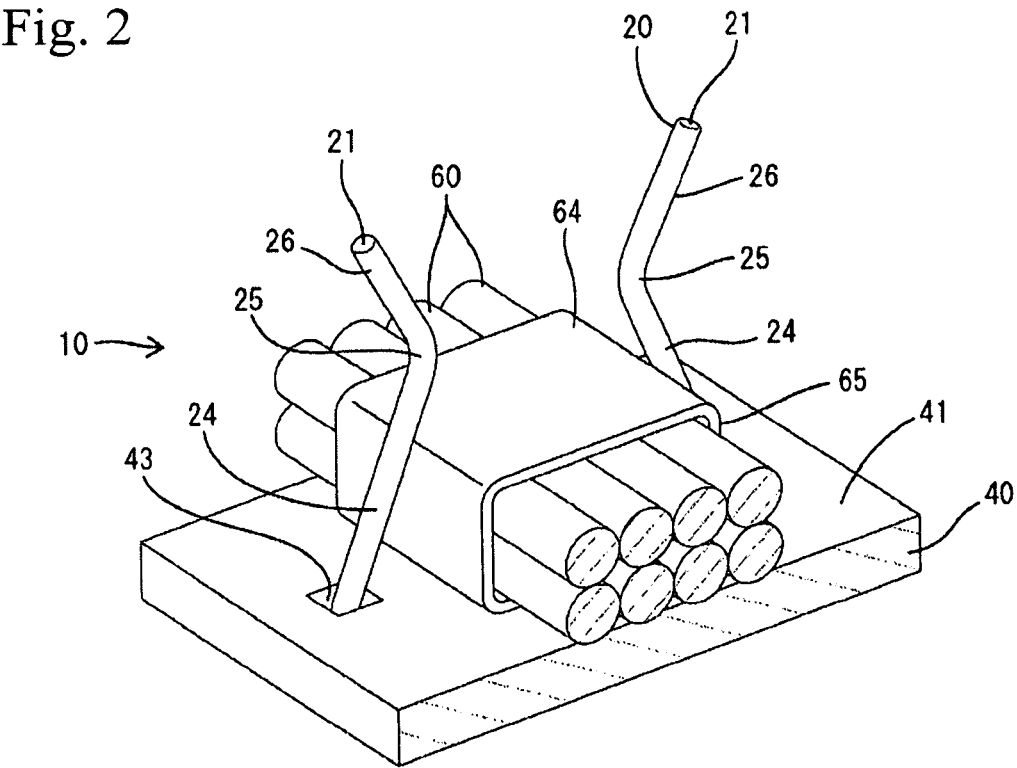
FIG. 2 is a perspective view showing a state in which each retaining piece is in a standing position and electrical wires are supported by a support surface of the plate.
Figure 3:
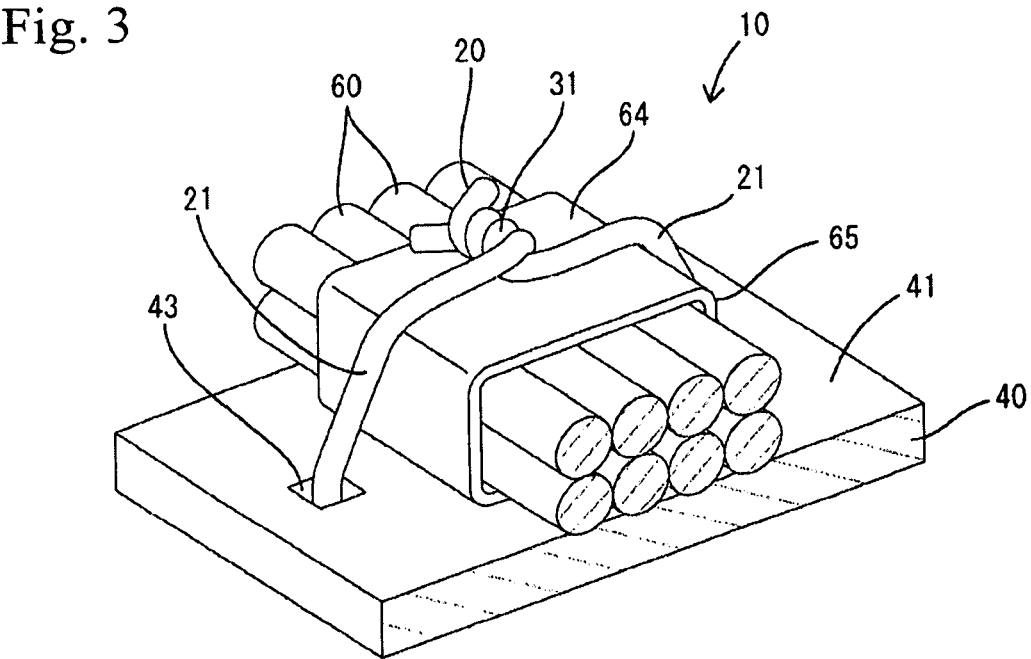
FIG. 3 is a perspective view showing a state in which each retaining piece is in a retaining position and the electrical wires are regularly retained between the support surface of the plate and the retaining member.
Figure 4:
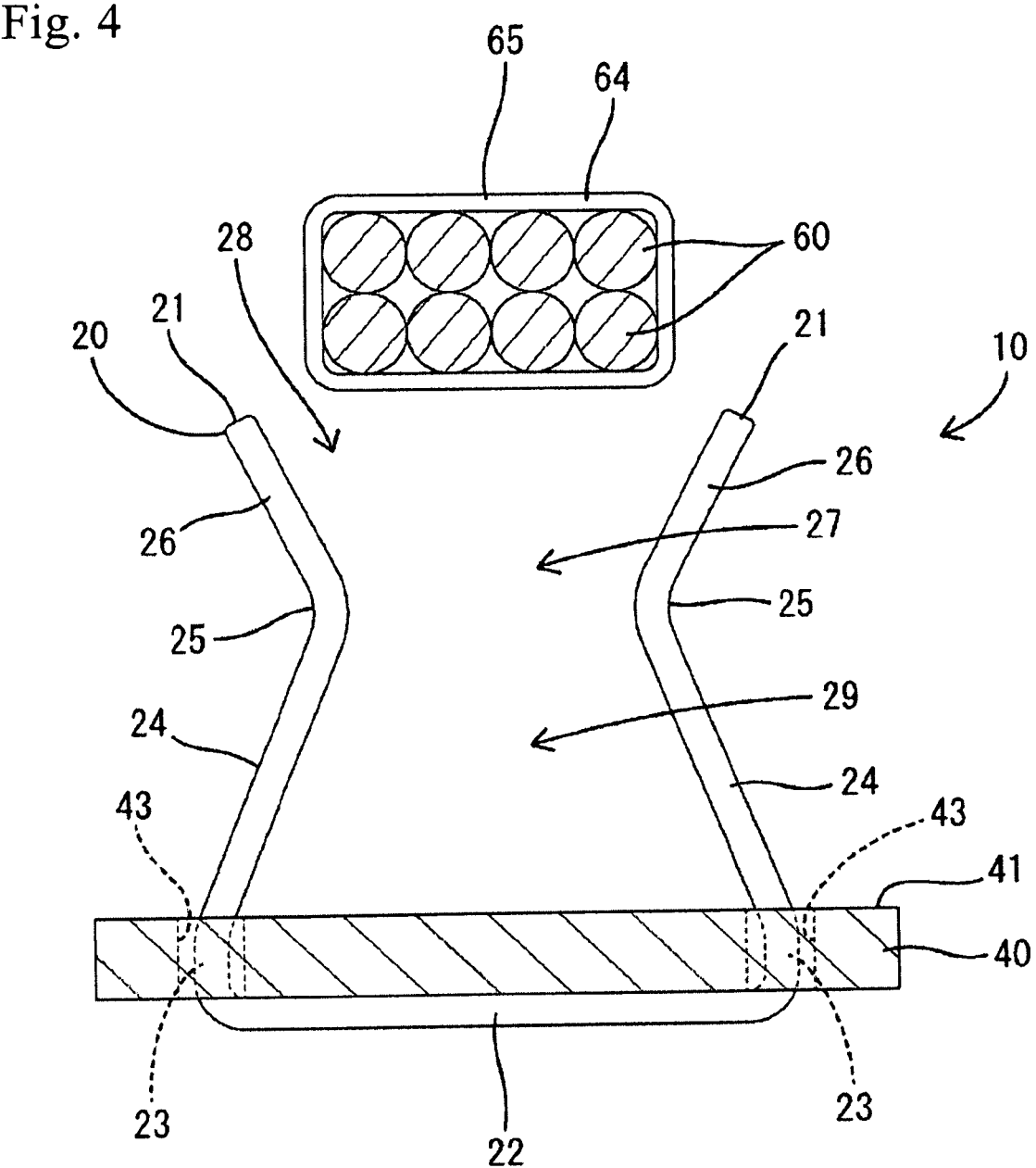
FIG. 4 is a front view showing a state in which each retaining piece is in a standing position immediately before the electrical wires are inserted into a guide space between the retaining pieces.
Figure 5:
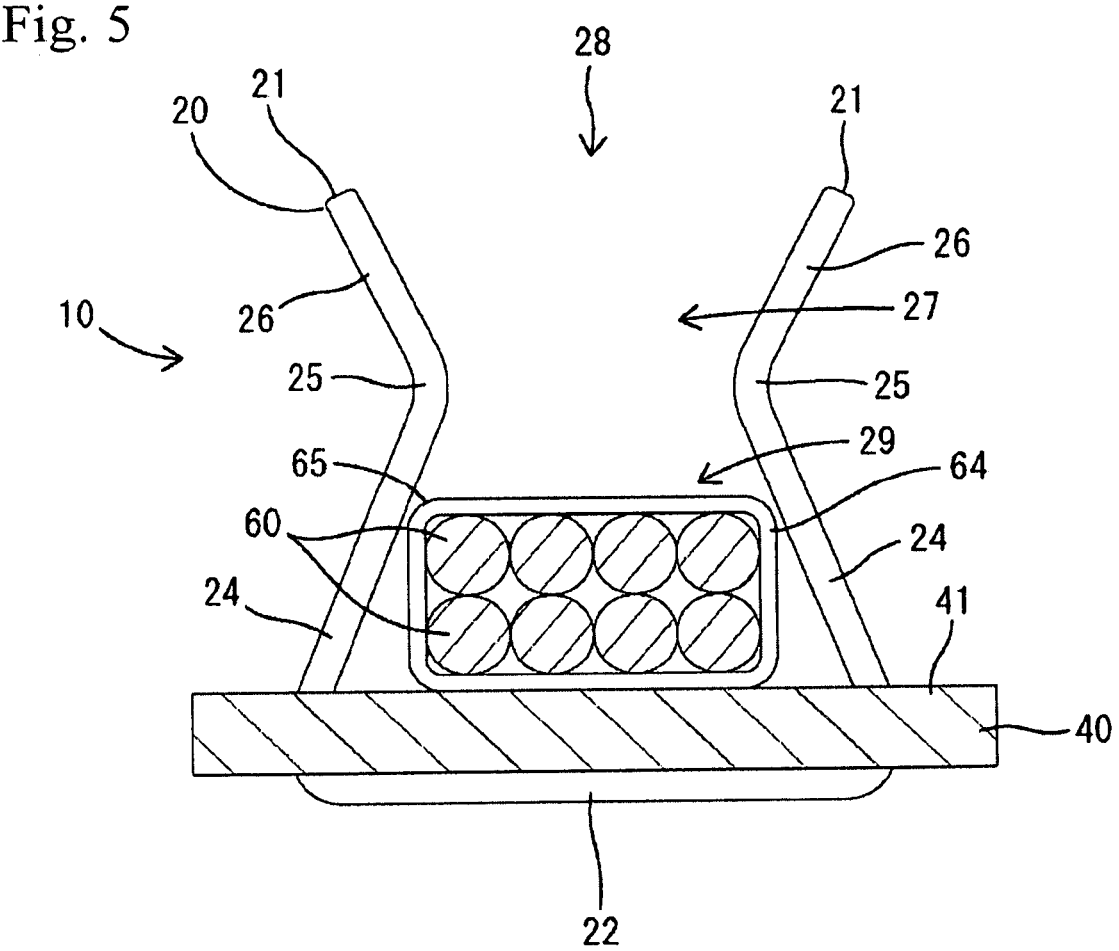
FIG. 5 is a front view showing a state in which each retaining piece is in a standing position and the electrical wires are supported by the support surface of the plate.

Subsequently, the wire bundle part 65 is inserted through the wire inlet 28 into the guide space 27 between the retaining pieces 21 and lowered toward the support surface 41 (refer to FIGS. 4 and 5). In the insertion process, the wire bundle part 65 slides along the wide portions 26, and the retaining pieces 21 are bent and deformed so that the retaining pieces 21 open wider. When the wire bundle part 65 is inserted into the temporary retaining space 29 and mounted on the support surface 41, the retaining pieces 21 resiliently recover and the side of the narrow portion end 25 of the narrow portion 24 of each retaining piece 21 comes into contact with the upper corner of the wire bundle part 65. This restricts removal of the wire bundle part 65 from the temporary retaining space 29 (refer to FIGS. 2 and 5). In other words, the narrow portions 24 of the retaining pieces 21 are in contact with the upper surface of the wire bundle part 65 to lightly and elastically press the wire bundle part 65 toward the support surface 41. Thus, the narrow portions 24 of the retaining pieces 21 are used as a temporary retainer that restricts lifting of the wire bundle part 65 from the support surface 41.

Each retaining piece 21 includes a distal end 31 (part corresponding to the wide portion 26 and the side of the narrow portion 24 located toward the narrow portion end 25). The distal ends 31 are collapsed toward teach other so that the retaining pieces 21 are deformed to the retaining position. At this time, as the distal ends 31 of the retaining pieces 21 are helically twisted around each other, the wire bundle part 65 is tightly forced toward the support surface 41 and firmly retained between the support surface 41 of the plate 40 and the retaining pieces 21 (refer to FIG. 7).

Figure 7:
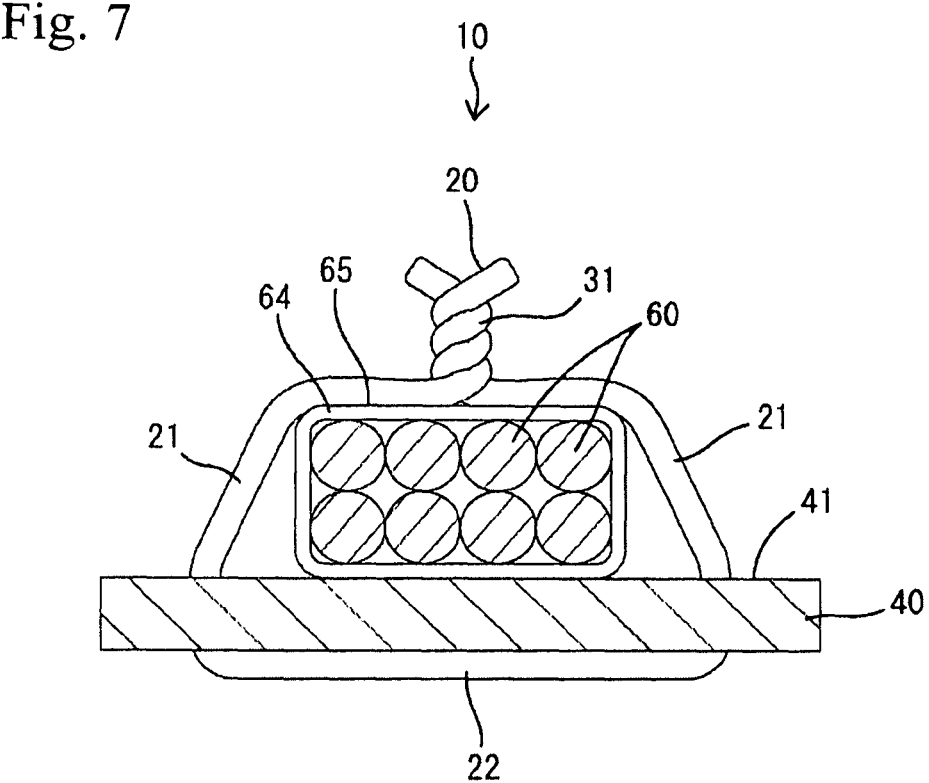
FIG. 7 is a front view showing a state in which each retaining piece is in a retaining position and the retaining pieces are twisted and tied together.
Figure 8:
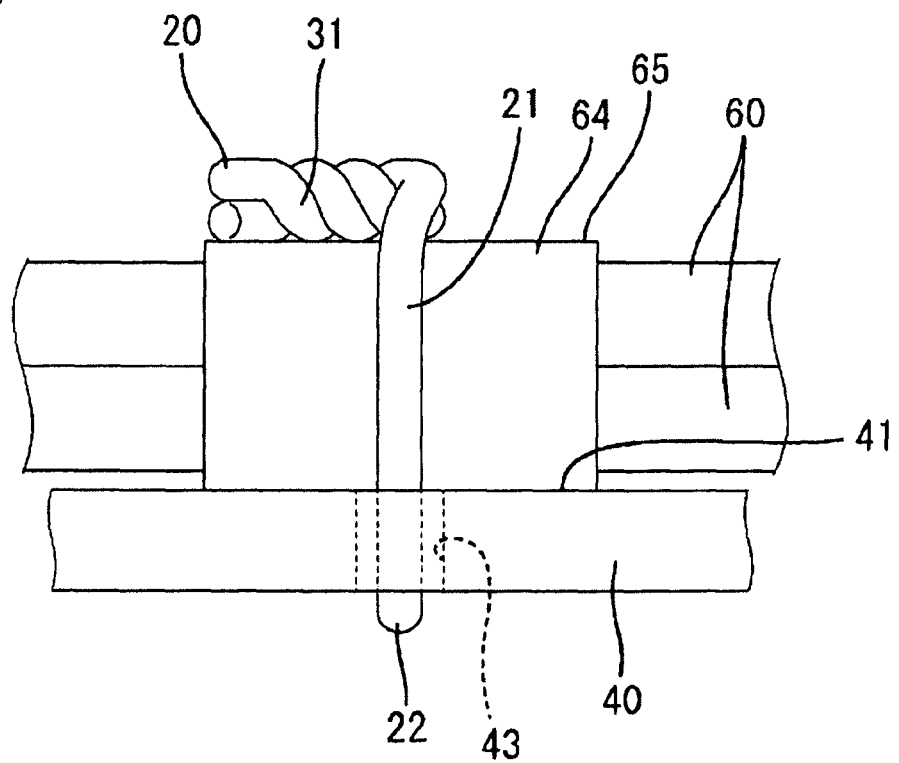
FIG. 8 is a side view showing a state in which each retaining piece is in a retaining position and the portions of the retaining pieces that are twisted and tied together are collapsed toward the electrical wires.

In addition, the distal ends 31 of the retaining pieces 21 are collapsed from the state shown in FIG. 7, in which the distal ends 31 of the retaining pieces 21 are twisted around each other to be upright and located at the side of the upper surface of the wire bundle part 65. When collapsed, the distal ends 31 of the retaining pieces 21 are arranged along the upper surface of the wire bundle part 65 to be contactable with the upper surface of the wire bundle part 65 (refer to FIG. 8). The collapse of the distal ends 31 of the retaining pieces 21 reduces the height-wise dimension of the retaining pieces 21 so that interference of the retaining pieces 21 with peripheral components is avoidable.

As described above, in the first embodiment, when routing the electrical wires 60 on the plate 40, the retaining pieces 21, which are upwardly arranged on the support surface 41 of the plate 40 so that the wire inlet 28 is open upward, are marks for the position into which the wire bundle part 65 is inserted. When the wire bundle part 65 is inserted into the guide space 27 between the retaining pieces 21, the wire bundle part 65 readily and smoothly reaches the support surface 41. As a result, the preparatory routing task may be omitted. This reduces the burden of the wiring task.

In addition, the space used to perform the task for inserting the wire bundle part 65 is allocated above the support surface 41, which is an unused space. Further, the distal ends 31 of the retaining pieces 21 are collapsed from the standing position and deformed to the retaining position, which reduces the height-wise dimension. This reduces the space constraints and readily avoids interference with peripheral components. Furthermore, the distal ends 31 of the retaining pieces 21 are collapsed toward the wire bundle part 65 in the retaining position. This further reduces the height-wise dimension of the retaining pieces 21 to further reduce the space constraints.

The retaining pieces 21 are bendable and deformable in directions toward each other and away from each other. In the standing position, the retaining pieces 21 include the tapered wide portions 26 widening toward the wire inlet 28 of the guide space 27. Thus, the wire bundle part 65 smoothly reaches the support surface 41 along the wide portions 26. In addition, each narrow portion 24, which is located at a side of the wide portion 26 opposite to the wire inlet 28, includes the temporary retainer restricting lifting of the wire bundle part 65 from the support surface 41. Thus, when the retaining pieces 21 are in the standing position, unintentional removal of the wire bundle part 65 from the guide space 27 is prevented.

In addition, since the retaining member 20 is formed of a wire member, the weight may be reduced while obtaining a superior processability so that the twisting process of the retaining pieces 21 is facilitated. The retaining pieces 21 are twisted and tied together in the retaining position. This allows adjustment of the tying diameter of each retaining piece 21. Thus, the diameter and shape of the wire bundle part 65 do not need to be constant.

The retaining member 20 includes the connecting piece 22 connecting the retaining pieces 21 to each other. The connecting piece 22 is disposed along the rear surface (surface opposite to the support surface 41) of the plate 40. The retaining pieces 21 are positioned by being inserted into the respective slots 43 in the plate 40. Thus, the retaining member 20 is reliably and stably coupled to the predetermined position of the plate 40.

Other Embodiments

Other embodiments according to the present disclosure will now be briefly described.

The retaining member may be configured by a wide plate.

Three or more retaining pieces may be provided.

Each retaining piece may be configured to surround a strip-shaped plate to be coupled to the plate instead of being inserted into slots in the plate.

The plate may be formed from a synthetic resin.

The electrical wires may be retained between the support surface of the plate and the retaining member without being covered with the protection tube.

Installation of the wire unit is not limited to an automatic transmission of an automobile. The wire unit may be widely used in a location that needs a plate retaining wires.

If the routing path is complex, a preparatory wiring task may be performed. The present disclosure does not intend to preclude the preparatory wiring task.

DESCRIPTION OF THE REFERENCE CHARACTERS

10 . . . wire unit
20 . . . retaining member
21 . . . retaining piece
22 . . . connecting piece
24 . . . narrow portion (temporary retainer)
26 . . . wide portion
27 . . . guide space
28 . . . wire inlet
40 . . . plate
41 . . . support surface
43 . . . slot
60 . . . electrical wire

The invention claimed is:

1. A wire unit, comprising:
a plate, the plate including a support surface that supports multiple electrical wires, an opposite surface that is opposite to the support surface, and slots extending through the plate between the support surface and the opposite surface;
a retaining member that retains the electrical wires between the support surface and the retaining member; and
a protection tube that covers the electrical wires collected in a bundle, wherein
the retaining member is formed of a metal wire member and includes multiple retaining pieces projecting from a side of the support surface,
each of the retaining pieces is configured to be collapsed from a standing position in which the retaining pieces stand to define a guide space between the retaining pieces, wherein the guide space is configured to guide the electrical wires toward the support surface, and configured to be deformed to a retaining position that presses the electrical wires toward the support surface,
the retaining pieces are bendable and deformable in directions toward each other and away from each other,
in the standing position, each of the retaining pieces includes a tapered wide portion that widens toward a wire inlet of the guide space, and a narrow portion located at a side of the wide portion opposite to the wire inlet, and
the narrow portion includes a temporary retainer that restricts lifting of the electrical wires from the support surface,
the protection tube is held between the retaining member and the electrical wires
the retaining member includes a connecting piece that connects the retaining pieces to each other,
the retaining pieces are inserted into the respective slots from the opposite surface to the support surface of the plate so that the tapered wide portions and the narrow portions of the retaining pieces project from the support surface of the plate while the connecting piece of the retaining member is disposed along the opposite surface of the plate, and
the retaining member is coupled to and positioned in the plate with elastic repulsion of the retaining member that is generated through insertion of the retaining pieces into the slots.

2. The wire unit according to claim 1, wherein
the retaining pieces are twisted and tied together in the retaining position.

3. The wire unit according to claim 2, wherein in the retaining position, portions of the retaining pieces that are twisted and tied together are disposed in a state collapsed toward the electrical wire.

4. A wire unit, comprising:
a plate, the plate including a support surface that supports an electrical wire, an opposite surface that is opposite to the support surface and slots extending through the plate between the support surface and the opposite surface; and
a retaining member that retains the electrical wire between the support surface and the retaining member, wherein
the retaining member includes multiple retaining pieces projecting from a side of the support surface,
each of the retaining pieces is configured to be collapsed from a standing position in which the retaining pieces stand to define a guide space between the retaining pieces, wherein the guide space is configured to guide the electrical wire toward the support surface, and configured to be deformed to a retaining position that presses the electrical wire toward the support surface,
the retaining pieces are bendable and deformable in directions toward each other and away from each other,
in the standing position, each of the retaining pieces includes a tapered wide portion that widens toward a wire inlet of the guide space, and a narrow portion located at a side of the wide portion opposite to the wire inlet,
the narrow portion includes a temporary retainer that restricts lifting of the electrical wire from the support surface,
the retaining member includes a connecting piece that connects the retaining pieces to each other,
the retaining pieces are inserted into the respective slots from the opposite surface to the support surface of the plate so that the tapered wide portions and the narrow portions of the retaining pieces project from the support surface of the plate while the connecting piece of the retaining member is disposed along the opposite surface of the plate, and
the retaining member is coupled to and positioned in the plate with elastic repulsion of the retaining member that is generated through insertion of the retaining pieces into the slots.

5. A wire unit, comprising:
a plate including a support surface that supports multiple electrical wires;
a retaining member that retains the electrical wires between the support surface and the retaining member; and
a protection tube that covers the electrical wires collected in a bundle, wherein
the retaining member is formed of a metal wire member and includes multiple retaining pieces projecting from a side of the support surface,
each of the retaining pieces is configured to be collapsed from a standing position in which the retaining pieces stand to define a guide space between the retaining pieces, wherein the guide space is configured to guide the electrical wires toward the support surface, and configured to be deformed to a retaining position that presses the electrical wires toward the support surface,
each of the retaining pieces has a tapered wide portion that widens toward a wire inlet of the guide surface in the standing position and a narrow portion including a narrowest portion in the opposite side of the wire inlet of the tapered wide portion in the standing position,
when the retaining pieces are in the standing position, the retaining pieces are configured to be bent and deformed to allow the electric wires and the protective tube to move from the guide space to the temporary retaining space through a necked gap formed between the narrowest portions of the retaining pieces,
when the retaining pieces are in the standing position, the narrow portions of the retaining pieces and the support surface cooperate to contact and sandwich the electric wires and the protective tube therebetween in the temporary retaining space and restrict lifting of the electric wires and the protection tube from the support surface.

* * * * *